United States Patent
Heldmann et al.

(10) Patent No.: US 11,131,387 B2
(45) Date of Patent: Sep. 28, 2021

(54) SEALING RING AND SEAL ARRANGEMENT COMPRISING SUCH A SEALING RING

(71) Applicant: Carl Freudenberg KG, Weinheim (DE)

(72) Inventors: Martin Heldmann, Lindenfels (DE);
Jens Hofmann, Mannheim (DE);
Guenter Hintenlang, Abtsteinach (DE)

(73) Assignee: CARL FREUDENBERG KG, Weinheim (DE)

( * ) Notice: Subject to any disclaimer, the term of this patent is extended or adjusted under 35 U.S.C. 154(b) by 110 days.

(21) Appl. No.: 16/194,418

(22) Filed: Nov. 19, 2018

(65) Prior Publication Data

US 2019/0170255 A1  Jun. 6, 2019

(30) Foreign Application Priority Data

Dec. 1, 2017  (DE) .................... 10 2017 011 117.0

(51) Int. Cl.
| | |
|---|---|
| *F16J 15/3284* | (2016.01) |
| *F16J 15/3228* | (2016.01) |
| *F16J 15/3244* | (2016.01) |
| *F16J 15/322* | (2016.01) |
| *F16J 15/3236* | (2016.01) |
| *F16J 15/3268* | (2016.01) |

(52) U.S. Cl.
CPC ....... *F16J 15/3284* (2013.01); *F16J 15/3228* (2013.01); *F16J 15/3244* (2013.01); *F16J 15/322* (2013.01); *F16J 15/3236* (2013.01); *F16J 15/3268* (2013.01)

(58) Field of Classification Search
CPC .. F16J 15/3228; F16J 15/3244; F16J 15/3284; F16J 15/3268; F16J 15/3236; F16J 15/322
See application file for complete search history.

(56) References Cited

U.S. PATENT DOCUMENTS

| | | | |
|---|---|---|---|
| 2,358,536 A | 9/1944 | Reynolds | |
| 4,118,856 A * | 10/1978 | Bainard | F16J 15/3244 264/295 |
| 4,591,168 A * | 5/1986 | Holzer | F16J 15/3204 277/309 |
| 5,183,271 A | 2/1993 | Wada et al. | |
| 5,269,539 A | 12/1993 | Martin | |
| 5,615,894 A * | 4/1997 | vom Schemm | B29D 99/0053 277/559 |
| 8,011,672 B2 * | 9/2011 | Shimomura | F16J 15/3228 277/551 |

(Continued)

FOREIGN PATENT DOCUMENTS

| | | |
|---|---|---|
| CN | 200943706 Y | 9/2007 |
| DE | 10313958 A1 | 10/2004 |
| DE | 102011002491 A1 | 7/2012 |

*Primary Examiner* — Nicholas L Foster
(74) *Attorney, Agent, or Firm* — Leydig, Voit & Mayer, Ltd.

(57) ABSTRACT

A sealing ring includes: a supporting element; and a lip seal having at least one first and one second lip seal section having sealing materials differing from one another. The first lip seal section at one end is connected to the supporting element, and at an other end has a free end on which the second lip seal section is arranged. The second lip seal section includes an elastomeric sealing material.

9 Claims, 2 Drawing Sheets

(56) References Cited

U.S. PATENT DOCUMENTS

| | | | | |
|---|---|---|---|---|
| 8,413,995 | B2* | 4/2013 | Matsui | F16J 15/3244 |
| | | | | 277/559 |
| 8,919,782 | B2* | 12/2014 | Berdichevsky | F16J 15/3244 |
| | | | | 277/551 |
| 2001/0033058 | A1* | 10/2001 | Ikeda | F16J 15/3228 |
| | | | | 277/551 |
| 2003/0168817 | A1* | 9/2003 | Iwakata | F16J 15/3244 |
| | | | | 277/549 |
| 2004/0188950 | A1 | 9/2004 | Guillerme et al. | |
| 2008/0067759 | A1* | 3/2008 | Ashida | F16J 15/3228 |
| | | | | 277/644 |
| 2010/0109252 | A1* | 5/2010 | Matsui | F16J 15/324 |
| | | | | 277/559 |
| 2010/0320698 | A1* | 12/2010 | Shimomura | F16J 15/3228 |
| | | | | 277/572 |
| 2013/0341873 | A1 | 12/2013 | Benedix et al. | |
| 2014/0054864 | A1* | 2/2014 | Kohl | F16J 15/32 |
| | | | | 277/549 |
| 2014/0110904 | A1* | 4/2014 | Berdichevsky | F16J 15/3244 |
| | | | | 277/559 |
| 2016/0312895 | A1* | 10/2016 | Kohl | F16J 15/3244 |

\* cited by examiner

SEALING RING AND SEAL ARRANGEMENT COMPRISING SUCH A SEALING RING

CROSS-REFERENCE TO PRIOR APPLICATION

Priority is claimed to German Patent Application No. DE 10 2017 011 117.0, filed on Dec. 1, 2017, the entire disclosure of which is hereby incorporated by reference herein.

FIELD

The invention relates to a sealing ring and to a seal arrangement comprising such a sealing ring.

The sealing ring has a supporting element and a lip seal. In addition to such a sealing ring, the seal arrangement comprises a first machine element to be sealed and a second machine element to be sealed, which are arranged concentrically to one another and with a radial separation, wherein the sealing ring is arranged in the gap formed by the separation.

BACKGROUND

Such a sealing ring and such a seal arrangement are generally known. The first machine element can here be formed by a shaft to be sealed, the second machine element by a housing enclosing the shaft. The housing, the shaft, and the sealing ring define a space to be sealed with respect to the surroundings, wherein the space to be sealed is at least partially filled with a medium to be sealed, for example a lubricant.

The lip seal of the previously known sealing ring is a made in a single piece of uniform material, consisting of a polymer PTFE material, and proceeding from the supporting element bulges axially in the direction of the space to be sealed. The lip seal encloses the shaft, sealing under radial pre-tensioning.

On the side radially facing the shaft to be sealed, the lip seal is often provided with a conveyance structure for conveying the medium to be sealed axially in the direction of the space to be sealed, wherein the conveyance structure is formed for example by a spiral twist.

Of course, it must be noted that such a sealing ring, during its intended use, can seal only in a preferred rotational direction of the shaft to be sealed. For a rotational direction of the shaft to be sealed opposite to the preferred rotational direction, the medium to be sealed is undesirably conveyed by the conveyance structure from the space to be sealed in the direction of the surroundings. When the shaft is at rest, the medium to be sealed seeps from the space to be sealed along the conveyance structure into the surroundings. The previously known sealing ring does not fulfill its function in the described cases.

Because of the previously described usage properties, such sealing rings are used only when the shaft to be sealed has only one rotational direction.

PTFE materials for the lip seal are therefore advantageous when a high wear resistance, good temperature stability, and very good resistance to the medium to be sealed are required.

SUMMARY

In an embodiment, the present invention provides a sealing ring, comprising: a supporting element; and a lip seal having at least one first and one second lip seal section comprising sealing materials differing from one another, wherein the first lip seal section at one end is connected to the supporting element, and at an other end has a free end on which the second lip seal section is arranged, and wherein the second lip seal section comprises an elastomeric sealing material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

Two exemplary embodiments of the seal arrangement according to the invention each with the sealing ring according to the invention are schematically depicted in FIGS. 1 and 2 and are described in more detail below.

DETAILED DESCRIPTION

Figure 1:
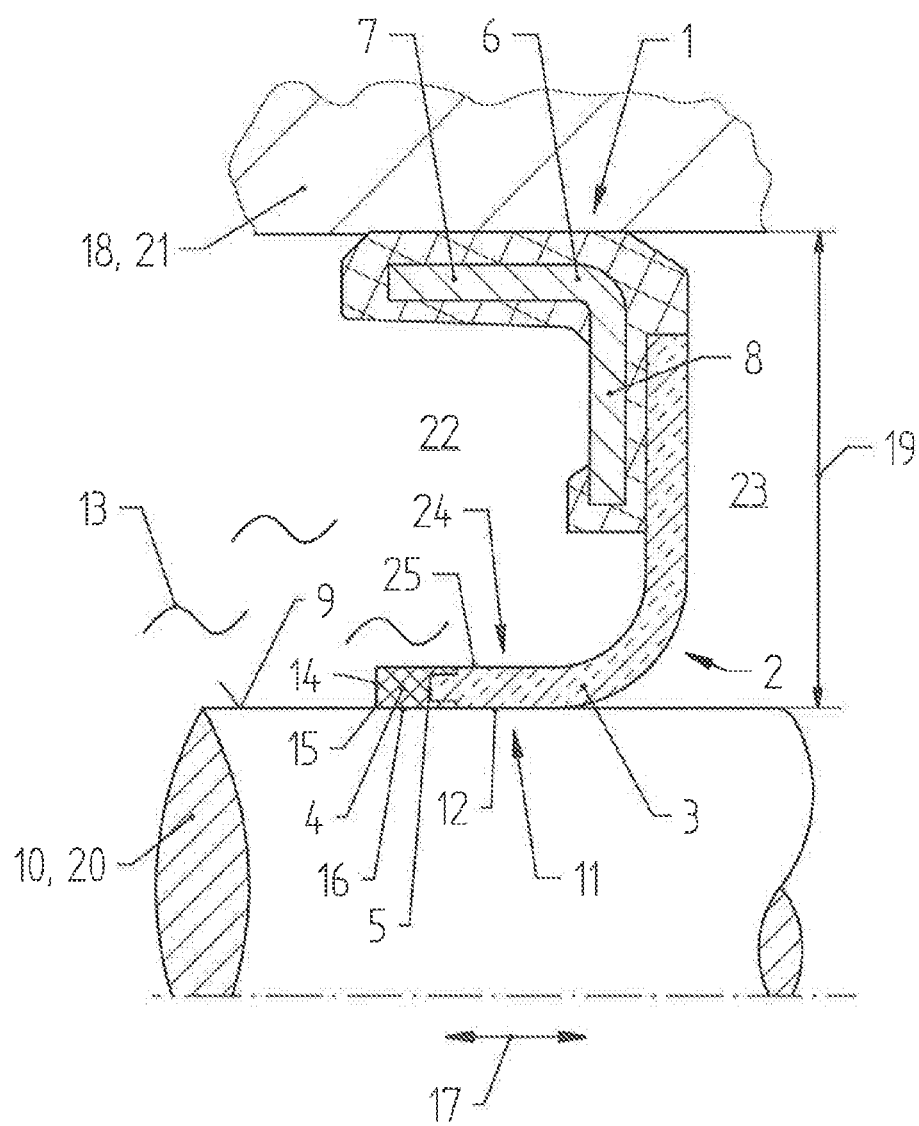

An object of the invention is to develop a sealing ring and a seal arrangement of the previously known type such that the sealing ring is better adapted to the specific circumstances of the use case, in particular such that it can seal the first machine element to be sealed not only dynamically but also statically. In this way, leaks during dynamic and static sealing are to be precluded, and the sealing ring should also then be capable of being used and should securely seal when the first machine element is rotated in the opposite direction to its preferred rotational direction.

This object is achieved according to the invention by a sealing ring with the features described herein and a seal arrangement with the features described herein.

To achieve the object, a sealing ring is provided comprising a supporting element and a lip seal having at least one first and one second lip seal section made of sealing materials differing from one another, wherein the first lip seal section at one end is connected to the supporting element, and at the other end has a free end on which the second lip seal section is arranged, and wherein the second lip seal section consists of an elastomeric sealing material.

In this regard it is advantageous that the second lip seal section consisting of an elastomeric sealing material also ensures a good seal of a space to be sealed against the surroundings even when the first machine element to be sealed, which is formed for example by a shaft, is stopped or rotates in the direction opposite that of the preferred rotational direction, regardless of the material from which the lip seal section is made. Such a sealing ring can be adapted especially well to the specific conditions of the use case.

Regardless of whether the first lip seal section could ensure a good static seal of a stopped first machine element and/or a good sealing action if the first machine element to be sealed rotates contrary to a preferred rotational direction, the second lip seal section consisting of the elastomeric sealing material takes over these tasks, so that such a sealing ring all in all ensures a good seal under all operating conditions.

The second lip seal section preferably consists of a softer sealing material than the first lip seal section. By means of such a comparatively softer second lip seal section, a good static seal can be attained. The comparatively softer sealing material of the second lip seal section comprises a first machine element to be sealed, for example a shaft sealing under resilient pretensioning, wherein the comparatively softer sealing material lies especially well against the surface to be sealed and seals reliably.

The first lip seal section preferably consists of a polymer material, for example preferably a PTFE material. Such materials, just as elastomeric materials, have a reliable track record in sealing technology, especially when high wear resistance, good resistance to the medium to be sealed, and high temperature resistance over a wide temperature range are required.

By the combination of the polymer material of the first lip seal section with the elastomeric sealing material of the second lip seal section, the normally existing disadvantage of lip seals made of polymer materials, according to which lip seals made of polymer material are not well suited for a static seal for a stopped first machine element, is mitigated.

The connection of the first and second lip seal section in the region of the free end of the first lip seal section can be a material bond and/or form-fitting connection. In particular when the first lip seal section consists of a PTFE material which does not bond very well with elastomeric materials, it is advantageous if, in the region of the free end, a type of mechanical interlock is provided in addition to the material bond so as to achieve a reliable and long-lasting connection of the lip seal sections to one another.

According to an advantageous embodiment, it can be provided that the supporting element comprises a support core having an axial leg and a radial leg, wherein the support core preferably consists of a metal material. Support cores made of a metal material can be produced easily and cheaply.

The support core ensures good shape retention of the sealing ring and sufficiently firm and lasting seat of the sealing ring in its installation space. The support core can be encased at least partially by an elastomeric material, wherein this casing sealingly contacts a boundary wall of the installation space of the sealing ring under resilient pretensioning. The boundary wall can delimit a drilled hole in a housing, for example, wherein the sealing ring is pressed into the drilled hole.

On the side radially facing a surface to be sealed of a first machine element to be sealed, the first lip seal section can have a first conveyance structure for conveying the medium to be sealed. By means of the first sealing surface provided with the first conveyance structure, the medium to be sealed, which is located under the first lip seal section and can also be used for lubricating the first lip seal section and thus for reducing friction and wear, is returned to the space to be sealed. In this way leakage is reduced to a minimum.

Instead of or in addition to the first conveyance structure, it can be provided that the first lip seal section has a further conveyance structure which faces radially away from a first machine element to be sealed and which acts indirectly on the first sealing surface of the first lip seal section. Such a further conveyance structure results in a thickness difference of the first lip seal section along its length, in a different contact pressure by which the first lip seal section lies against a surface to be sealed along its length, and thus in a pressure gradient in the sealing space between the first lip seal section and the surface to be sealed. Due to the pressure gradient, during the intended use of the sealing ring, a pump action is initiated within the sealing gap.

Surprisingly it has been shown that a pressure gradient within the sealing space and the resulting pump action also appear when the first lip seal section on the side radially facing the surface to be sealed of a first machine element to be sealed is smoothly formed in the sense of "without a first conveyance structure."

In addition, it is advantageous that the further conveyance structure ensures good lubricating behavior of the lip seal on the surface to be sealed. If the sealing ring is used as a shaft sealing ring, the first conveyance structure is arranged on the inner circumference of the lip seal on the side facing the shaft to be sealed, and the further conveyance structure is arranged on the outer circumference of the lip seal on the side facing away from the shaft to be sealed.

The second lip seal section can have a circumferential, self-contained sealing bead on the side radially facing a surface to be sealed of a first machine element to be sealed and on the side facing axially away from the first lip seal section. In this regard, it is advantageous that the self-contained sealing bead effects an especially reliable static seal of the space to be sealed against the surroundings. Due to the softer elastomeric material, compared with the first lip seal section, of the second lip seal section, the sealing bead seals especially well on the surface to be sealed. Even with rotation of the first machine element to be sealed contrary to the preferred rotational direction, the self-contained sealing bead ensures that the medium to be sealed is reliably retained within the space to be sealed.

The second lip seal section can have a second conveyance structure on the side radially facing a surface to be sealed of a first machine element to be sealed for conveying a medium to be sealed. The second conveyance structure, depending on the specific conditions of the use case, can have a conveyance structure which is directed in the opposite direction or in the same direction as the first conveyance structure of the first lip seal section.

If the conveyance direction of the second conveyance structure in the region of the second sealing surface of the second lip seal section is opposite to the conveyance direction of the first conveyance structure, a reliable seal by the sealing ring is also ensured if the first machine element to be sealed rotates for some time in the opposite direction from the preferred rotational direction. Rotation of the first machine element to be sealed opposite to the preferred rotational direction would, as described above, normally lead to conveyance of the medium to be sealed into the surroundings along the first conveyance structure.

Because the conveyance direction of the second conveyance structure is opposite to the conveyance direction of the first conveyance structure, the medium to be sealed is returned by the second conveyance structure in the direction of the space to be sealed when the first machine element to be sealed rotates in the direction opposite to that of the preferred rotational direction. If the conveyance directions of the two conveyance structures are the same, the second conveyance structure of the second lip seal section acts in a seal-supporting manner with the first conveyance structure when the machine element to be sealed rotates in the preferred rotational direction.

Lip seals with conveyance structures are generally known, wherein the conveyance structure is formed by a spiral twist, for example.

The second conveyance structure, viewed in the axial direction, can be arranged between the sealing bead and the free end of the first lip seal section. The sealing bead then forms the end of the lip seal on the side facing away from the supporting element. A sealing bead, within the meaning of the present application, is understood to be a self-contained sealing track of the second lip seal section.

According to another embodiment, the second conveyance structure, viewed in the axial direction, can be arranged on the side of the sealing bead facing away from the free end. In this regard, it is advantageous that the comparatively sensitive sealing material, during the transition from the stopped first machine element to the rotating first machine element is already well lubricated from the start. When the first machine element is paused, the second conveyance structure contains medium to be sealed, which is retained within the space to be sealed by the sealing bead that is adjacent in the direction of the surroundings.

As already explained above, it can be provided that during intended use of the sealing ring the first and the second conveyance structure each has a conveyance direction, which may be the same for both or may the opposite of one another.

In addition, the invention relates to a seal arrangement comprising a sealing ring as described above, as well as a first machine element to be sealed and a second machine element to be sealed, which are arranged concentrically to one another with a radial separation, wherein the sealing ring is arranged in the space formed by the separation.

The lip seal sections each sealingly enclose the first machine element with radial pretensioning, wherein the supporting element sealingly contacts the second machine element under radial pretensioning. The sealing ring is hereby sealingly arranged within its installation space.

In a seal arrangement as described above, the first machine element can be formed by a shaft to be sealed, and the second machine element by a housing enclosing the first machine element.

The first machine element, the second machine element, and the sealing ring delimit a space to be sealed that is filled at least partially with a medium to be sealed, wherein the lip seal preferably is precurved in the direction of the space to be sealed. Such a seal arrangement is especially well suited for most use cases.

Figure 2:
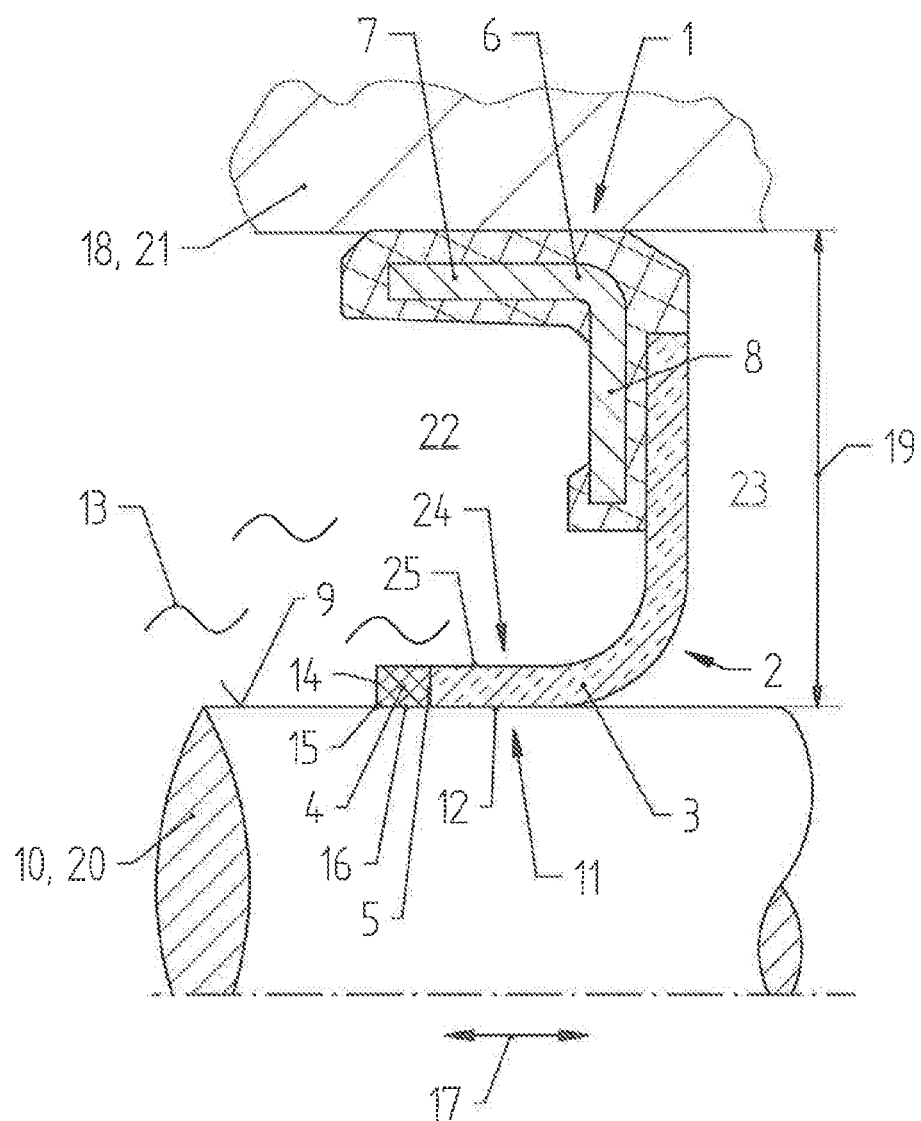

FIGS. 1 and 2 each show an exemplary embodiment of the seal arrangement according to the invention with the sealing ring according to the invention.

Apart from the sealing ring, the seal arrangement comprises the first machine element 10 to be sealed, which is formed by a shaft 20 to be sealed. In addition, the seal arrangement comprises the second machine element 18 to be sealed, which is formed by a housing 21. The housing 21 and the shaft 20 to be sealed are arranged concentrically to one another and with a radial separation. A gap 19 is formed by the radial separation, in which the sealing ring according to the invention is arranged.

The sealing ring comprises the supporting element 1, which is formed by the support core 6 with its axial arm 7 and its radial arm 8. The support core 6 in the exemplary embodiment shown consists of a metal material and is substantially encased by elastomeric material. This casing made of elastomeric material effects a static seal of the sealing ring with respect to the housing 21.

On the inside, the lip seal 2 of the sealing ring radially sealingly encloses the surface 9 to be sealed of the shaft 20 under radial pretensioning.

It is provided according to the invention that the lip seal 2 comprises the two lip seal sections 3, 4, which consist of sealing materials which differ from one another. The first lip seal 3 consists of a PTFE material, while the second lip seal section 4 consists of an elastomeric sealing material which is softer in comparison with the first lip seal section 3.

The first lip seal section 3 effects a dynamic seal of the shaft 20 rotating in a preferred rotational direction, while the second lip seal section 4 additionally effects a static seal when the shaft 20 is stopped or rotates in a direction which is the opposite of the preferred rotational direction. Here it is advantageous that with just one lip seal 2, both operating states, namely "rotating first machine element 10 to be sealed" and "stopped first machine element 10 to be sealed" can be sealed. The sealing ring, by means of its embodiment according to the invention, still functions well when the shaft 20 to be sealed rotates in a direction that is opposite to that of its preferred rotational direction.

The first lip seal section 3 has the first conveyance structure 12 on its side 11 radially facing the surface 9 to be sealed. This first conveyance structure 12, during intended use of the sealing ring, when the shaft 20 rotates in its preferred rotational direction, conveys the medium 13 to be sealed from under the lip seal 2 axially in the direction of the space 22 to be sealed.

The first conveyance structure can be formed by a spiral twist in the first sealing surface of the first lip seal section 3.

In the exemplary embodiments shown, in addition a further conveyance structure 25 is provided, which is arranged on side of the first lip seal section 3 facing radially away from the first conveyance structure 12.

In the exemplary embodiment shown, the second lip seal section 4 also has a conveyance structure 16. The conveyance structure 16 can also be formed as a spiral twist.

Depending on the conveyance direction of the second conveyance structure 16, the second conveyance structure 16 can support the action of the first conveyance structure 12, namely when the shaft 20 to be sealed rotates in the preferred rotational direction. In this case, the medium 13 to be sealed, which is located between the surface 9 to be sealed and the sealing surfaces of the lip seal 2, and is used for lubricating the lip seal 2, is returned axially in the direction of the space 22 to be sealed.

On the other hand, if the conveyance direction of the second conveyance structure 16 is in the opposite direction from the conveyance direction of the first conveyance structure 12, the second conveyance structure 16, when the rotational direction of the shaft 20 to be sealed is opposite to the preferred rotational direction, ensures that the seal is provided even during such "backward travel." When the rotational direction of the shaft 20 is opposite to the preferred rotational direction, the medium 13 to be sealed, which is located under the second sealing surface, is returned to the space 22 to be sealed by the second conveyance structure 16.

Regardless of the conveyance direction of the second conveyance structure 16, the second lip seal section 4 is provided with a circumferential self-contained sealing bead 15, which provides a static seal when the shaft 20 is stopped, and prevents the medium 13 to be sealed from getting into the surroundings 23 from the first space 22 to be sealed along the first conveyance structure 12 of the first lip seal section 3.

FIG. 1 shows a schematic representation of a first exemplary embodiment. The second lip seal section 4, in addition to a material bond, is connected by a sort of mechanical interlock to the free end 5 of the first lip seal section 3.

FIG. 2 shows a schematic representation of a second exemplary embodiment. The first lip seal section 3 and the second lip seal section 4 are butt-fitted to one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sealing ring for sealing a first machine element and a second machine element arranged concentrically to one another and with a radial separation, the first and second machine elements extending in an axial direction, the sealing ring being configured to be disposed in a gap formed by the separation, the sealing ring comprising:

a supporting element; and a lip seal having at least one first and one second lip seal section comprising sealing materials differing from one another, wherein the first lip seal section at one end is connected to the supporting element, and at an other end has a free end on which the second lip seal section is arranged, wherein the sealing material of the second lip seal section comprises an elastomeric sealing material, the second lip seal section having a first end and a second end, the second lip seal section being attached at its first end exclusively to the free end of the first lip seal section, wherein the first lip seal section is configured to convey a medium to be sealed in a first conveyance direction along the axial direction, wherein the second lip seal section is configured to convey the medium to be sealed in a second conveyance direction along the axial direction, and wherein the first conveyance direction is opposite the second conveyance direction.

2. The sealing ring according to claim 1, wherein the sealing material of the second lip seal section is softer than the sealing material of the first lip seal section.

3. The sealing ring according to claim 1, wherein the sealing material of the first lip seal section comprises a polymer.

4. The sealing ring according to claim 1, wherein the first lip seal section comprises PTFE.

5. The sealing ring according to claim 1, wherein the first and the second lip seal section have a material bond and/or form-fitting connection.

6. The sealing ring according to claim 1, wherein the supporting element has a support core having an axial leg and a radial leg, and wherein the support core comprises a metal material.

7. The sealing ring according to claim 1, wherein the lip seal sections are configured to sealingly enclose the first machine element with radial pretensioning, and wherein the supporting element is configured to sealingly contact the second machine element under radial pretensioning.

8. The sealing ring according to claim 1, wherein the first machine element comprises a shaft to be sealed and the second machine element comprises a housing enclosing the first machine element.

9. The sealing ring according to claim 1, wherein the sealing ring is configured to delimit a space to be sealed which is filled at least partially with a medium to be sealed, and wherein the lip seal is precured.

* * * * *